United States Patent [19]

Leonard et al.

[11] 4,319,778
[45] Mar. 16, 1982

[54] CAB-OVER MOTORHOME BED STRUCTURE

[75] Inventors: Larry W. Leonard, Redlands; Arie Shikler, Mission Viejo, both of Calif.

[73] Assignee: Fleetwood Enterprises, Inc., Riverside, Calif.

[21] Appl. No.: 159,648

[22] Filed: Jun. 16, 1980

[51] Int. Cl.³ .............................................. B60P 3/34
[52] U.S. Cl. ....................................... 296/166; 5/118; 296/190
[58] Field of Search .............. 296/190, 170, 166, 165, 296/171, 172, 173, 175; 5/118, 119, 465

[56] References Cited

U.S. PATENT DOCUMENTS

| | | | |
|---|---|---|---|
| 3,160,435 | 12/1964 | Smith | 296/176 |
| 3,288,517 | 11/1966 | Bender | 296/165 |
| 3,469,881 | 9/1969 | McNamee | 296/165 |
| 3,637,251 | 1/1972 | Plant | 296/166 |
| 3,675,965 | 7/1972 | Burdett | 296/156 |
| 4,005,898 | 2/1977 | Way | 296/174 |
| 4,025,102 | 5/1977 | Hiles | 296/167 |

Primary Examiner—Richard A. Bertsch
Assistant Examiner—Randall A. Schrecengost
Attorney, Agent, or Firm—Edward D. O'Brian

[57] ABSTRACT

A bed structure which is primarily intended for use in an extension of the body of a motorhome extending over the cab of the motorhome can be constructed so as to utilize a support holding a mattress pad so that they are capable of being manipulated between normal use positions in which the support and the pad serve as a normal part of the bed to another non-use position in which both the support and the pad are located above another second support of the bed. This second support holds a second pad which is constructed so as to coact with the first pad on the first support so as to fit on top of the first pad when the first support and pad are shifted to the non-use position above the second support. A strap is provided for returning the second pad to its normal position when the first support and the first pad are moved back to their normal positions.

9 Claims, 4 Drawing Figures

CAB-OVER MOTORHOME BED STRUCTURE

BACKGROUND OF THE INVENTION

The invention set forth in this specification pertains to new and improved bed structures. It is primarily directed to bed structures which are intended to be utilized in combination with cab-over motorhomes so as to facilitate communication beween the cab and the body of such a motorhome when the bed structure in such a motorhome is not in use as a bed.

In the construction of various different types of motorhomes the conservation of space is of primary importance. It is considered that it is well established that various items of equipment used in such motorhomes such as beds should preferably be designed so that they can be easily and conveniently manipulated so as to either be capable of serving a dual function or so that they can be easily and conveniently manipulated between stored, out-of-the-way non-use positions and their normal positions. In order to minimize the size of motorhomes it is conventional to construct them so that their bodies have extensions containing beds located above the cabs of such motorhomes. Normally such motorhomes are constructed so as to include an access opening between the rears of such cabs and the bodies of such motorhomes. The presence of a bed in such an extension effectively limited the dimensions of such an access opening.

As a result of this it has been proposed to utilize a sliding support panel forming a part of the bed in the side of a bed in such an extension generally above the rear of the cab. Such structures have been built with the intension that the sliding support could be pushed forwardly over an adjacent support part of the bed so as to provide an opening in the bed of such dimension as to permit an enlarged opening extending between the cab and the body of the motorhome. This prior structure utilized several elongated mattress pads capable of being stacked one above another in front of the sliding panel or support when the sliding panel or support is in an open position.

Although unquestionably this type of structure is advantageous as compared to prior motorhome structures in which the bed limited the size of the opening between the cab and the body of the motorhome it is considered relative disadvantageous. The reasons for this pertain to what may be generally termed as convenience of use. Because of the limited dimensions in the space within an extension of a motorhome body extending above a cab it is relatively difficult to manipulate mattress pads so as to stack them and unstack them in the extremities of such an extension generally remote from the center region of a motorhome body. Individuals utilizing motorhomes generally desire it to be as simple and convenient as reasonably possible to utilize the various items of equipment in such motorhomes so as to manipulate such items of equipment to different use positions or between storage and use positions.

SUMMARY OF THE INVENTION

The invention set forth in this specification is intended to provide new and improved bed structures which, when used in combination with cab-over type motorhome bodies, are more convenient to utilize than prior bed structures as indicated in the preceding discussion. It is not to be assumed from this that the bed structures of the present invention are only useful in connection with such motorhomes. It is considered that the bed structures set forth herein are capable of being utilized in a wide variety of different applications where it is desired to use bed structures which may be easily and conveniently manipulated from a normal bed-type position to a second more compact non-use position or configuration. The invention set forth in this specification is also intended to provide bed structures which can be easily and conveniently constructed at a comparatively nominal cost, which may be easily and conveniently manipulated between positions as indicated, and which are capable of being utilized for prolonged periods with minimal maintenance.

In accordance with this invention the various objectives of the invention as indicated in the preceding are achieved by providing a bed structure including at least two bottom mattress supports and at least two mattress pads, said supports and said pads of said bed structure having normal positions in which the tops of said supports are located adjacent to one another and in which said mattress pads cover said supports and are located in side-by-side relationship, at least one of said supports and at least one of said pads being movable so as to reduce the area occupied by said bed structure in which the improvement comprises: means supporting a first of said supports so that it is capable of being moved from its normal position with respect to a second of said supports to a position above said second support, a first mattress pad located on said first support so as to be movable therewith, a second mattress pad located on said second support, said second pad being capable of being moved with respect to said second support so as to be positioned so that it is spaced from said second support above said second support, said first and said second pads including side edges which are located adjacent to one another when in said normal positions, each of said side edges including a sloping surface, said sloping surfaces being sloped with respect to one another so as to be capable of elevating said second pad so that it is positioned above said first pad when said first support is moved from its normal position toward and over said second support, strap means connecting to said second pad with said second support for preventing said second pad from being moved with said first pad and said first support as said first support is moved from a position over said second support to its normal position.

BRIEF DESCRIPTION OF THE DRAWING

The invention is best more fully described by referring to the accompanying drawing in which.

Figure 1:
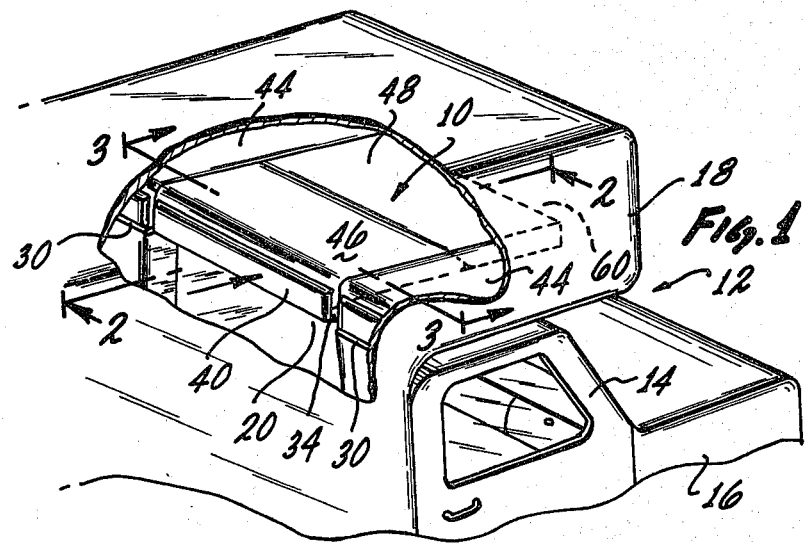
FIG. 1 is an isometric view, partially broken away, of a motorhome constructed so as to include a bed structure in accordance with this invention.

The specific structure illustrated is considered to be a presently preferred structure utilizing the concepts of the present invention as are set forth and defined in the appended claims forming a part of this specification. It will be realized that the concepts expressed in these claims can be easily embodied within a wide variety of different specific structures through the normal use or exercise of routine mechanical engineering skill.

DETAILED DESCRIPTION

In the drawing there is shown a bed structure 10 of the present invention which is utilized in combination with a motorhome 12 having a cab 14 and a body 16 extending generally to the rear of the cab 14. This body 16 includes a more or less box shaped extension 18 extending over the cab 14. An opening 20 is provided in the cab 14 so as to allow communication between the interior of the cab 14 and the interior of the body 16. An appropriate seal (not shown) of a conventional character is preferably provided between the cab 14 and the body 16 around the opening 20. The bed structure 10 is located in this extension 18 generally above the opening 20.

The bed structure 10 is composed of various parts as hereinafter described in more detail which in their normal positions constitute a conventional rectilinear bed having ends 22 and sides 24. The particular bed structure 10 includes a first support 26 and a second support 28. These supports 26 and 28 may be formed out of any conveniently available material such as a sheet of plywood. The second support 28 is of a generally U type shape or configuration and has end panels 30 extending adjacent to the ends 22 connected by a cross-panel 32. The first support 26 is adapted to cover the space generally between the panels 30 adjacent to the cross-panel 32 and is dimensioned so as to include parallel edges 34 which rest upon the end panels 30.

Figure 4:
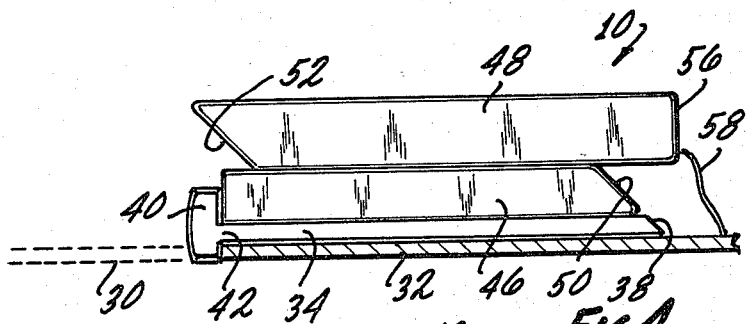
FIG. 4 is a partial cross-sectional view at an enlarged scale reasonably corresponding to FIG. 2 showing the bed structure in a non-use position so as to facilitate access between the cab and the body of the motorhome.

Preferably small flange-like rails 36 are mounted on these end panels 30 as shown so as to limit the movement of the first support 26 so that it can only move linearly. Although it is not considered necessary various expedients such as rollers (not shown) can be utilized between the first support 26 and the rails 36 so as to minimize the difficulty in moving this first support 26. In its normal position as shown in FIG. 4 this first support 26 includes a sloping edge 38 located immediately adjacent and parallel to the cross-panel 32. Preferably this first support 26 also includes a padded flange 40 located along an edge 42 parallel to the sloping edge 38.

The bed structure 10 also includes two end mattress pads 44 located over the end panels 30. These pads 44 are of slightly less width than these end panels 30. A first mattress pad 46 is also located on the first support 26 and a second mattress pad 48 is also located on the cross-panel 32 when the parts of the bed structure 10 as herein indicated are located in normal use positions. It is noted that the first pad 46 is of slightly less thickness than the other pads 44 and 48 so that the entire bed structure 10 will have a comparatively smooth, flat upper surface (not numbered) when the various parts indicated are in their normal use positions.

Figure 2:
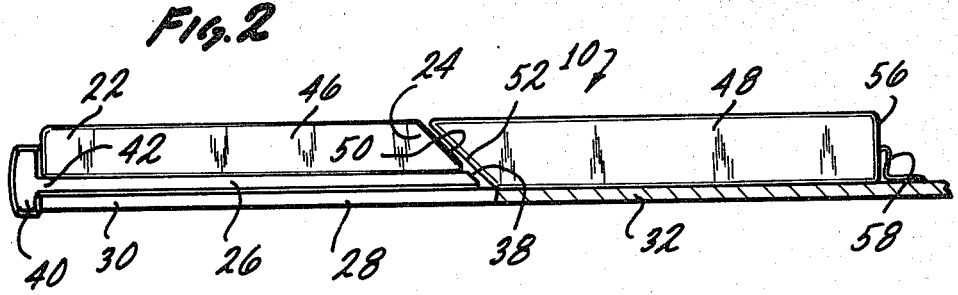
FIG. 2 is a partial cross-sectional view at an enlarged scale taken at line 2—2 of FIG. 1.

The pads 46 and 48 are provided with side edge sloping surfaces 50 and 52, respectively, as shown which fit against one another in FIG. 2 of the drawing. The surface 50 in effect constitutes a continuation of the sloping edge 38. The sloping surface 52 extends outwardly from the cross-panel 32 so as to extend a short distance above the space between the two end panels 30 generally above the sloping edge 38 when the first support 26 is in its normal position. Although it is not considered absolutely necessary it is preferred to secure the first pad 46 to the first support 26 in any convenient way such as, for example, through the use of conventional interlocking attachments 54. It is also preferred to secure the second pad 48 to the extremity or edge 56 of the cross-panel 32 remote from the first support 26 by one or more elongated flexible straps 58. Preferably straps 58 are of a somewhat elastic character.

Figure 3:
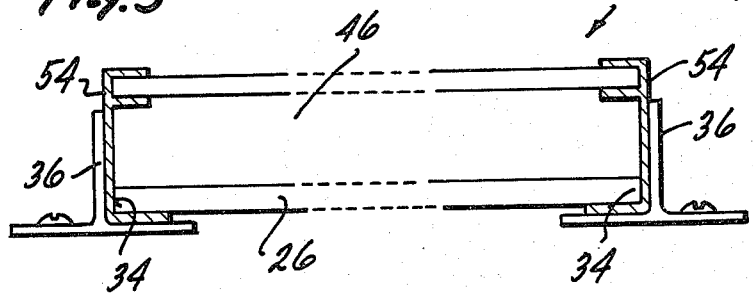
FIG. 3 is a partial cross-sectional view at an enlarged scale taken at line 3—3 of FIG. 1.

From the preceding description of the various parts of the bed structure 10 it is considered that it will be obvious as to how the various parts of this bed structure 10 are manipulated from normal positions as indicated in FIGS. 1 to 3 to a non-use position as indicated in FIG. 4. During such manipulation the first support 26 will merely be pushed toward the cross-panel 32. As this occurs the comparatively rigid sloping edge 38 of the first support 26 will hit against the sloping surface 52 so as to initially deflect it upwardly; more or less concurrently the sloping surface 50 will abut and push against the sloping surface 52. Such action will cause the second pad 48 to elevate so as to slide over the first pad 46 as the first support 26 is moved so as to expose the opening 20 to a maximum possible extent.

In order to maximize the amount that the opening 20 may be exposed it is preferred that the first support 26 and the cross-panel 32 are approximately of equal dimension so that each extends approximately one-half of the distance between the sides 24. During such movement of the first support 26 the flange 40 will tend to prevent movement of the first pad 46 off of the first support 26 as a result of any tendency of the second pad 48 to push against the first pad 46. During such movement of the first support 26 the second pad 48 will normally tend to abut against a wall 60 in the extension 18 in such a manner as to promote the lifting of the second pad 48 above the first pad 46.

The bed structure 10 may be easily manipulated so as to be utilized as a normal bed after it has been manipulated to a non-use position as indicated in FIG. 4 by the simple expedient of pulling the first support 26 back to its original position. As this is done the strap 58 will retain the second pad 48 so that as the first pad 46 is moved out from under the second pad 48 the second pad 48 will tend to fall back into its original or normal position. Any tendency for the first pad 46 not to move along with the first support 26 may be easily overcome by manual engagement with the first pad 46 or through the use of the attachments 54 described in the preceding.

We claim:

1. A bed structure including at least two bottom mattress supports and at least two mattress pads, said supports and said pads of said bed structure having normal positions in which the tops of said supports are located adjacent to one another and in which said mattress pads cover said supports and are located in side-by-side relationship, at least one of said supports and at least one of said pads being movable so as to reduce the area occupied by said bed structure in which the improvement comprises:

means supporting a first of said supports so that it is capable of being moved from its normal position with respect to a second of said supports to a position above said second support, a first mattress pad located on said first support so as to be movable therewith, a second mattress pad located on said second support, said second pad being capable of being moved with respect to said second support so as to be positioned so that it is spaced from said second support above said second support, said first and said second pads including side edges which are located adjacent to one another when in said normal positions, each of said side edges including a sloping surface, said sloping surfaces being sloped with respect to one another so as to be capable of elevating said second pad so that it is positioned above said first pad when said first support is moved from its normal position toward and over said second support, strap means connecting to said second pad with said second support for preventing said second pad from being moved with said first pad and said first support as said first support is moved from a position over said second support to its normal position.

2. A bed structure as claimed in claim 1 including:

wall means located adjacent to a side edge of said second pad remote from said first support for preventing movement of said second pad generally away from said first support and said first pad as said first support and said first pad are moved from their normal positions to said position over said second support.

3. A bed structure as claimed in claim 1 including:

flange means for preventing movement of said first pad relative to said first support as said first support is moved from its normal position to said position above said second support located on said first support adjacent to a side edge of said first pad remote from said second pad and said second support when said first support is in its normal position.

4. A bed structure as claimed in claim 1 wherein:

said means supporting said first support hold said first support so that it is capable of being moved linearly to said position above said second support from its initial position, said first support includes a sloping edge capable of engaging a part of said sloping surface on said second pad so as to elevate said second pad when said first support is moved from its normal position toward and over said second support, said sloping edge on said first support being sloped so as to appear as a continuation of said sloping surface on said first pad.

5. A bed structure as claimed in claim 4 wherein:

said first pad is of less thickness than said second pad so that when said pads are located in their normal positions they are located with respect to one another so as to provide a flat top for said bed structure.

6. A bed structure as claimed in claim 4 wherein:

said means supporting said first support comprise two parallel rails for controlling the movement of said first support.

7. A bed structure as claimed in claim 1 wherein:

when said support and said pad are in their normal positions said bed structure is of a rectangular shape and has ends and sides, said first and said second supports are each of a rectangular shape and are located so as to be spaced from the ends of said bed structure, said first and said second support each extends approximately one-half of the distance between said sides of said bed structure when in their normal positions.

8. A bed structure as claimed in claim 1 including:

a motorhome having a cab and a body located so as to extend generally to the rear of said cab, said body including an extension extending over said cab, said bed structure being located within said extension in a position in which said first support tends to block communication between said cab and said body when it is in its normal position and in which the ease of communication between said cab and said body is improved by moving said first support to said position above said second support.

9. A bed structure as claimed in claim 1 including:

a motorhome having a cab and a body located so as to extend generally to the rear of said cab, said body including an extension extending over said cab, said bed structure being located within said extension in a position in which said first support tends to block communication between said cab and said body when it is in its normal position and in which the ease of communication between said cab and said body is improved by moving said first support to said position above said second support, wall means located adjacent to a side edge of said second pad remote from said first support for preventing movement of said second pad generally away from said first support and said first pad as said first support and said first pad are moved from their normal positions to said position over said second support, said wall means form a part of said extension, flange means for preventing movement of said first pad relative to said first support as said first support is moved from its normal position to said position above said second support located on said first support adjacent to a side edge of said first pad remote from said second pad and said second support when said first support is in its normal position, and wherein said means supporting said first support hold said first support so that it is capable of being moved linearly to said position above said second support from its initial position, said first support includes a sloping edge capable of engaging a part of said sloping surface on said second pad so as to elevate said second pad when said first support is moved from its normal position toward and over said second support, said sloping edge on said first support being sloped so as to appear as a continuation of said sloping surface on said first pad, said first pad is of less thickness than said second pad so that when said pads are located in their normal positions they are located with respect to one another so as to provide a flat top for said bed structure, said means supporting said first support comprise two parallel rails for controlling the movement of said first support, when said support and said pad are in their normal positions said bed structure is of a rectangular shape and has ends and sides, said first and said second supports are each of a rectangular shape and are located so as to be spaced from the ends of said bed structure, said first and said second support each extends approximately one-half of the distance between said sides of said bed structure when in their normal positions.

* * * * *